US012249761B2

(12) United States Patent
Caruso et al.

(10) Patent No.: US 12,249,761 B2
(45) Date of Patent: Mar. 11, 2025

(54) FIRST SURFACE DECORATIVE ELEMENT

(71) Applicant: MOTHERSON INNOVATIONS COMPANY LIMITED, London (GB)

(72) Inventors: Dean Caruso, Lonsdale (AU); Simon David Field, Lonsdale (AU); Bastian Stoehr, Lonsdale (AU); Scott Edwards, Lonsdale (AU)

(73) Assignee: Motherson Innovations Company Limited, London (GB)

(*) Notice: Subject to any disclaimer, the term of this patent is extended or adjusted under 35 U.S.C. 154(b) by 369 days.

(21) Appl. No.: 17/767,285

(22) PCT Filed: Oct. 15, 2020

(86) PCT No.: PCT/EP2020/079058
§ 371 (c)(1),
(2) Date: Apr. 7, 2022

(87) PCT Pub. No.: WO2021/074303
PCT Pub. Date: Apr. 22, 2021

(65) Prior Publication Data

US 2022/0384940 A1 Dec. 1, 2022

(30) Foreign Application Priority Data

Oct. 15, 2019 (AU) ................................ 2019903885

(51) Int. Cl.
*H01Q 1/42* (2006.01)
*H01Q 1/32* (2006.01)

(52) U.S. Cl.
CPC ........... *H01Q 1/422* (2013.01); *H01Q 1/3233* (2013.01)

(58) Field of Classification Search
CPC ........ H01Q 1/422; H01Q 1/3233; H01Q 1/44; H01Q 1/02; H01Q 1/06; H01Q 1/42
See application file for complete search history.

(56) References Cited

U.S. PATENT DOCUMENTS

| | | | | |
|---|---|---|---|---|
| 2004/0125023 A1 | 7/2004 | Fujii et al. | | |
| 2010/0304182 A1* | 12/2010 | Facchini | ................. | C25D 3/12 205/255 |
| 2011/0047784 A1* | 3/2011 | Ohtake | ..................... | G01S 7/03 29/600 |

(Continued)

FOREIGN PATENT DOCUMENTS

| | | |
|---|---|---|
| DE | 102007059758 A1 | 6/2009 |
| DE | 102015004204 A1 | 8/2015 |

OTHER PUBLICATIONS

International Search Report and Written Opinion of the International Searching Authority, PCT/EP2020/079058, mailed Jan. 22, 2021.

*Primary Examiner* — Seokjin Kim
(74) *Attorney, Agent, or Firm* — Jones Day

(57) ABSTRACT

The invention is directed to a decorative vehicle element including a, preferably radio-transmissive, substrate having a first surface on a first side and a second surface on a second side; and a first surface, preferably radio-transmissive, decorative coating on the substrate, the decorative coating including a decorative layer consisting of a metal or consisting of an alloy including a metal; as well as a radar system including a radio wave transmitter, a radio wave receiver and a decorative element, especially radome.

38 Claims, 5 Drawing Sheets

(56) References Cited

U.S. PATENT DOCUMENTS

| | | | |
|---|---|---|---|
| 2012/0119961 | A1 | 5/2012 | Mayer Pujadas |
| 2013/0194687 | A1 | 8/2013 | Hall et al. |
| 2014/0093665 | A1* | 4/2014 | Horibe .................. B60R 13/005 428/31 |
| 2014/0218263 | A1 | 8/2014 | Burdenski et al. |
| 2017/0352938 | A1* | 12/2017 | Okumura ............... H01Q 1/425 |
| 2018/0159207 | A1 | 6/2018 | Shurish et al. |
| 2019/0013576 | A1* | 1/2019 | Mayer Pujadas ........ G02B 1/11 |
| 2019/0275759 | A1* | 9/2019 | Nishio .................... B32B 9/041 |
| 2019/0305411 | A1* | 10/2019 | Mayer Pujadas ........ H01Q 1/42 |
| 2019/0315093 | A1* | 10/2019 | Nishio .................. G01S 13/931 |
| 2020/0124701 | A1* | 4/2020 | Takahashi ............. G01S 17/931 |

* cited by examiner

A Mean 0.93dB – 76-77GHz
Mean 0.79dB – 76-81GHz

B Mean 0.30dB – 76-77GHz
Mean 0.36dB – 76-81GHz

Rsin = Reflection specular included

Rsex = Reflection specular excluded

FIRST SURFACE DECORATIVE ELEMENT

CROSS-REFERENCE TO RELATED APPLICATIONS

This application is a National Stage Entry of International Patent Application No. PCT/EP2020/079058, filed on Oct. 15, 2020, which claims the benefit of priority to Australian Patent Application No. AU 2019903885, filed on Oct. 15, 2019, each of which is hereby incorporated by reference in its entirety for all purposes

TECHNICAL FIELD

The present invention relates to an element, especially radome, including a decorative first surface coating. Particularly the element is useful for automotive purposes and therefore the first surface coating needs to meet the strict wear and resilience requirements needed for external automotive components, and in case of a radome, as well as being sufficiently radio-transparent to permit minimally attenuated transmission of radio wave frequencies used in Radio Detection and Ranging (RADAR) systems. Furthermore, the element should be visually appropriate for the desired purpose.

BACKGROUND OF INVENTION

Since the beginning of the automotive industry in vehicles decorative elements are used. Furthermore since their development in the early 20th century, Radio Detection and Ranging (RADAR) systems have evolved and have been miniaturised such that they are now integrated into a range of everyday devices. One common use of radar is in driver assistance systems in vehicles. Radar is used for a variety of warning systems, semi-autonomous systems and autonomous systems in vehicles. Such systems include proximity detection, which can be used for parking assistance, adaptive cruise control, crash avoidance and blind spot detection. Further, radar, in combination with light illuminating detection and ranging (LIDAR) systems, provide the sensing systems being developed for autonomous, and semi-autonomous, vehicles.

Radar systems work on the basis that illuminating radio waves (radar signals), emitted from a transmitter, are reflected or scattered by solid objects. These reflected radar waves are then detected by a receiver, which is generally proximal to the transmitter, allowing the radar system to detect an object. Typically, radio waves are reflected when travelling between mediums having different electric conductivity. As such, radar systems are particularly effective at detecting electrically conductive materials, such as metals. However, this presents a problem when trying to develop radar compatible materials which have a metallic appearance.

As it is not desirable to externally view systems behind a decorative element, like the radar system in case of a radome, and as the systems, especially the radar system, need to be protected from environmental damage, systems like radar systems are typically located behind a decorative element, especially a radome. A radome is an example of a decorative element in form of a protective cover which is substantially radio-wave transparent, and therefore does not substantially attenuate the radio signals. Suitable materials for providing a radome include synthetic polymers (such as plastics) which are electrically insulating. However, integration of such plastic elements, especially radomes, when a metallic finish is desired, has been difficult to achieve. Typical metallic finishes, such a chromium films on plastic, reflect radio signals and therefore are not suitable for use in radomes.

Traditionally, in an automotive context, radar transmitters and receivers are positioned at the front of the vehicle in an upper portion of, or above, a vehicles front grill. Increasingly there is market-demand for multiple radar-based systems in vehicles including blind-spot detection (BSD), lane-change assist (LCA), front/rear cross-traffic alert (F/RCTA), autonomous emergency braking (AEB), and adaptive cruise control (ACC). This has driven the need for positioning of radar transmitters and sensors on many different positions on a vehicle such as behind facias including bumpers and body panels. There is a need for suitable components that can be used on the exterior of a car and are radar compatible.

Traditional vehicle body components are not ideal radomes for use with radar systems. Metal body panels are incompatible with radar and therefore radar systems need to be positioned behind radio-transmissive substrates, such as plastic panels. However, many plastics used to make body panels include fillers such as talc and carbon which significantly attenuate radar. In many instances this is by design to make the vehicle visible to other radar systems. Even when the substrate is radio-transmissive the overlaying layers of paint affect radar transmission. Metallic components of popular paints and basecoats containing effect pigments also affect the radar transparency of the panel. Further, many of the design constraints of the external panels of a vehicle are determined by factors unrelated to, and in some instances incompatible with, optimal radar efficiency. Therefore, it may be desirable to provide radar compatible trim which only constitutes a small portion of the façade of a vehicle and can act as a radome for the underlying radar system. In some instances, it is desirable for these trim elements to have a metallic appearance.

Techniques and systems have been developed to provide plastic elements, like radomes, with a metallic appearance. However, all these techniques and systems require complex layering of substrates with sandwiched layers of metallic appearance.

One example includes US patent application US 2017/0057424 A1, which utilises a nanolayer film stack which includes no metal components. Such complex film stacks need to be protected from the external environment as they are susceptible to surface scratching. The use of such complex films, as well as multiple layers to provide backing and protection for the film results in significant production costs and time, as well as introducing a number of quality control issues and points of failure. Other radomes utilise complex combinations of films, paints, deposited metals and complex heat masking, again resulting in high production time and costs.

EP1560288 describes alternative means to provide a radome with a visually metallic component. This document discloses the deposition of a thin film of Tin and/or an alloy of Tin on a transparent substrate. The substrate is then overlayed with a further opaque backing plate, which in practice, is adhered to the front layer. However, the use of an adhesive increases production complexity and costs and may result in the components being susceptible to delamination between the first and the second layer. This leads to radio wave attenuation and inaccuracies in the radar system.

Most of the element, especially radomes on the market with a metallic appearance include a first surface protective polymer adhered over the decorative coating or film thereby encasing it within polymer layers. This functions to provide the element, especially radome with a uniform thickness and, importantly, protects the decorative coating or film from the external environment. However, such methods are not suitable for providing larger decorative components such as body panels.

Decorative trim and plastic bumpers are not suitable to be formed of multiple plastic layers, as has been proposed for element, especially radome badges. Therefore, there is a need to provide car panels and trim with a metallic appearance and a simplified production process that provide radio-transmissive decorative coatings and are sufficiently robust.

The above discussion of background is included to explain the context of the present invention. It is not to be taken as an admission that any of the material referred to was published, known or part of the common general knowledge at the priority date of any one of the claims.

SUMMARY OF INVENTION

The present invention provides a decorative element, especially radome, including: a, preferably radio-transmissive, substrate having a first surface on a first side and a second surface on a second side; and a first surface, preferably radio-transmissive, decorative coating on the substrate, the decorative coating including a decorative layer consisting of a metal or consisting of an alloy including a metal. Consequently, the present invention provides a decorative element, especially radome, with a, preferably radio-transmissive, decorative coating on the outer surface of the element, unlike present decorative elements which include a cover layer, typically of plastic, to protect the decorative coating.

A simplified element, especially radome, having a first surface coating allows more design freedom to provide a larger range of components that may be used in a variety of circumstances. The decorative element can be especially used as at least one handle, at least one control panel, at least one door handle, at least one trim, at least one ornamental strip, at least one decorative panel, at least one decorative cover, at least one mirror surface, and/or at least one door wave element. With specific regard to vehicles, current elements, especially radomes, are largely restricted to a central-front location of a vehicle. However, there is a desire to provide 360° radar coverage of vehicles to provide driver assistance, semi-autonomous and autonomous capabilities. For example, by providing trim around the vehicle that is radar transparent and is metallic in appearance radar systems can be positioned in various locations on the vehicle without compromising the look of the vehicle. Such radar-transparent trim is not possible using traditional techniques for providing a radome, which utilise a decorative layer sandwiched between two substrate layers.

To permit use as a radome, the decorative coating must minimally attenuate or reflect radio wavelength electromagnetic frequencies (radio waves) while substantially absorbing or reflecting electromagnetic radiation in the visible spectrum. This can be achieved by providing one or more electrically isolated, or non-conductive, metal thin film layer(s), or one or more metal alloy layer(s).

To provide a non-conductive alloy including metal, it is preferable to include a metalloid. Therefore, in some embodiments the alloy of a metal further includes a metalloid. Preferable metalloids include germanium and/or silicon.

In embodiments, where the alloy of a metal includes germanium it is preferred that the concentration of germanium is at least 25 wt % germanium, or at least 40 wt % germanium, or at least 45 wt % germanium, or at least 50 wt % germanium, or at least 55 wt % germanium. Such concentrations provide optimal visual appearance and sufficiently low radio wave attenuation or reflection.

Especially to minimise radio wave attenuation and reflection, the decorative layer should be provided as a thin film. Therefore, in some embodiment, the decorative layer is up to 100 nm thick, or up to 50 nm thick, or up to 40 nm thick, or from 10 nm to 40 nm thick, or from 20 nm to 40 nm thick, or from 25 nm to 35 nm thick or about 30 nm thick.

A variety of metals can be used for the deposition of the metal layer, or for the metal component of the alloy including a metal. In some embodiments, the metal layer consists of a metal selected from the group of: indium or tin. In some embodiments, the alloy includes a metal selected from the group of: aluminium, silver, tin, indium or chromium.

Suitable radio transmissive alloys may include: germanium and aluminium and, optionally, silicon; or germanium and silicon; or germanium and silver and, optionally, silicon; or germanium and indium and, optionally, silicon; or aluminium and germanium and/or silicon; or chromium and germanium and/or silicon.

The inventors have identified that when providing a first surface decorative coating it is advantageous to control the residual stress of the decorative coating. Without being bound by theory, it is identified as being important that the residual stress of the decorative coating is within a desired range that is compatible with the substrate (preferably a synthetic polymer substrate).

It is has been identified that the first surface decorative element, especially radome, will exhibit sufficient resilience in durability tests, when the overall residual stress of the, preferably radio-transmissive decorative coating is greater than or equal to −120 MPa, or greater than or equal to −50 Mpa, or greater than or equal to −40 MPa. More preferably, the overall residual stress of the, preferably radio-transmissive decorative coating is neutral (0 MPa) or tensile (>0 MPa).

In embodiments of the decorative coatings where the decorative layer is aluminium and germanium the net residual stress will preferably be greater than or equal to −120 MPa, preferably greater than or equal to −50 MPa. In embodiments of the, preferably radio-transmissive decorative coatings where the decorative layer is chromium and germanium the net residual stress will preferable be greater than or equal to −70 Mpa, preferably up to +170 Mpa.

The residual stress of the decorative layer can be modified to a degree by modifying the deposition parameters and the thickness of the layer. However, additional layers can be provided, such dielectric layers or hard coat layers, which can further modify the overall residual stress of the decorative coating to within the desired range. These coatings, particularly the dielectric layer, can also modify the optical properties and visual appearance of the, preferably radio-transmissive decorative coating.

Consequently, in some embodiments the first surface decorative element, especially radome, includes multiple layers. In some embodiments the multiple layers of the decorative coating include a stress controlling and/or bonding layer. The location of the stress controlling layer, in a multi-layered decorative coating, can be any suitable location. However, in some embodiments a stress controlling layer is provided between the, preferably radio-transmissive, substrate and the decorative layer. Alternatively, or additionally, a stress controlling layer can be provided on the first side of the decorative layer. The stress-controlling and/or bonding layer may include at least one metal, at least one metal alloy and/or at least one dielectric material.

In some embodiments, wherein the, preferably radio-transmissive, decorative coating comprises multiple layers, the, preferably radio-transmissive, decorative coating includes at least one dielectric layer in addition to the decorative layer. In some embodiments, this dielectric layer is provided between the decorative layer and the, preferably radio-transmissive, substrate. In some further embodiments, the multiple layers of the, preferably radio-transmissive, decorative coating include at least one decorative layer between at least two dielectric layers. In some embodiments, the, preferably radio-transmissive, decorative coating includes multiple dielectric layers and/or multiple decorative layers. Preferably, the dielectric layers and the decorative layers are alternating.

Preferred deposition methods, which may be used for applying the one or more layers of the, preferably radio-transmissive, decorative coating to the substrate can be chosen from any physical vapour deposition system. Such systems may include thermal evaporation, electron beam evaporation (with or without ion beam assistance), sputter deposition pulsed laser deposition, cathodic arc deposition of electrohydrodynamic deposition. Additionally, the surface of the, preferably radio-transmissive, substrate may first be subjected to treatment prior to deposition to improve adhesion between the decorative layer and the substrate. In some embodiments the surface treatment may be selected from: plasma discharge, corona discharge, glow discharge and UV radiation.

In some embodiments, the, preferably radio-transmissive, decorative coating can be tuned to achieve the desired stress window by optimising the deposition parameters of one or more of its layers. These parameters include sputter power, gas pressure, gas dopants (such as nitrogen) and coating thickness. Stress can also be tuned by introducing a thermal stress component by way of substrate heating, or by conducting a pre-treatment process directly before the deposition of layers or he, preferably radio-transmissive, decorative coating.

Means are known in the art for measuring residual stress within the decorative coating or within individual layers. For example, the decorative coating can be placed on a glass slide and the glass slide can be placed into a stress measurement device (such as a Sigma Physik SIG-500SP) before and after deposition of a layer or the coating.

The residual stress may be modified by deposition of a layer of a material which, when deposited, produces a desired level of stress to compensate for the inherent residual stress of the decorative layer. Suitable materials include $SiO_x$, $SiO_xN_y$, $CrN_x$, $NbO_x$, $TaO_x$, and $ZrO_x$, where x and y are both preferably between 0.1 and 2.0. In some embodiments which include a dielectric layer, the dielectric layer is $SiO_x$ or silicon dioxide. Such a layer can be used to control the overall stress of the, preferably radio-transmissive, decorative coating and may also influence its visual properties, depending on the positioning of the layer within the, preferably radio-transmissive, decorative coating.

It will thus be apparent that when the desired optical effect of the decorative layer is required to be altered, concomitant changes will likely also be required to one or more additional layers of the decorative coating to ensure that the overall residual stress of the decorative coating is maintained in the desired window.

The provision of a, preferably radio-transmissive, decorative coating on the first surface of an element, especially radome, exposes the, preferably radio-transmissive, decorative coating to the external environment. This results in the, preferably radio-transmissive decorative coating being exposed to a variety of conditions, such as UV light, temperature extremes, rain, dust, dirt and a range of chemicals. Further, in applications such as external automotive trim, the decorative element, especially radome, is further exposed to projectiles such as rocks and debris. Therefore, the, preferably radio-transmissive, decorative coating of the element, especially radome, is required to be sufficiently resilient to be used in such an environment. To improve the resilience of the, preferably radio-transmissive, decorative coating, in some embodiments, the, preferably radio-transmissive, decorative coating may include at least one protective hard coat layer. Typically, this will be the upper most layer of the, preferably radio-transmissive, decorative coating and therefore will protect the underlying layers. However, in some embodiments, there may be an additional capping layer that provides characteristics, such as hydrophobic, hydrophilic, lipophobic, lipophilic and oleophobic or combinations thereof. The protective hard coat layer can add optical features to the decorative element. Especially the protective hard coat layer may at least partly include light scattering additive to further influence the out appearance of the decorative element in the desired way.

Further, hard coat layers can function as bonding layers or stress control layers within a multi-layered, preferably radio-transmissive, decorative coating. Consequently, in some embodiments, the, preferably radio-transmissive, decorative coating includes a hard coat layer between the decorative layer and the, preferably radio-transmissive, substrate. Preferably, the decorative coating includes a hard coat layer provided on the first surface of the, preferably radio-transmissive, substrate. In some embodiments, the hard coat layer is between the decorative coating and the, preferably radio-transmissive, substrate (but might not be in direct contact with the, preferably radio-transmissive substrate).

Without being bound by theory, the hard coat layer likely improves binding of the subsequent layers (such as the decorative layer) to the underlying layer or the, preferably radio-transmissive, substrate and helps control the differential stress between the layers and the overall residual stress of the, preferably radio-transmissive, decorative coating.

Additional layers can interface between a hard coat layer applied to the first surface of the, preferably radio-transmissive, substrate and the decorative layer. In some embodiments, a dielectric layer is provided between the decorative layer and the protective hard coat.

Suitable materials are known in the art for providing a hard coat layer for example the hard coat layer may includes one or more abrasion resistant layers including a material selected from the group consisting of an organo-silicon, an acrylic, a urethane, melamine and an amorphous SiOxCyHz.

As discussed above, it is advantageous to keep the residual stress of the, preferably radio-transmissive, decorative coating within an optimal range of greater than or equal to −120 MPa, or greater than or equal to −70 Mpa, or greater than or equal to −50 Mpa, or greater than or equal to −40 MPa. As the protective hard coat layer can influence the overall residual stress of the decorative coating, in some embodiments the overall residual stress of the, preferably radio-transmissive, decorative coating is measured with the protective hard coat. In some embodiments, the overall residual stress is measured in the absence of the protective hard coat.

The radio-transmissive substrate for the decorative coating can be any suitable substrate that is sufficiently radio transparent and is fit for the intended purpose of the element, especially radome. However, preferably the, preferably radio-transmissive substrate is a synthetic polymer, such as: Acrylonitrile Ethylene Styrene (AES), Acrylonitrile butadiene styrene (ABS), acrylonitrile styrene acrylate (ASA), Polyamide (PA), polybutylene terephthalate (PBT), Polycarbonate (PC), Polyethylene (PE), Polyethylene Teraphthalate (PET), Poly(methyl methacrylate) (PMMA), Polyoxymethylene (POM), Polypropylene (PP), Polyurethane (PU), Poly-Vinyl-Chloride (PVC), high-flow AES, acrylonitrile-(ethylene-propylene-diene)-styrene (AEPDS), blends of thermoplastics, or PC-ABS blended thermoplastic. In some embodiments, the, preferably radio-transmissive, substrate is Polycarbonate or Polypropylene.

Radio waves can be significantly attenuated by water, particularly ice, which can precipitate on the element, especially radome, in cold conditions. This is particularly prevalent when the element, especially radome, is used to provide the external panels of vehicles. Therefore, to de-ice the element, especially radome, and allow optimal function, some embodiments of the decorative element, especially radome, of the present invention include a heating element.

In preferred forms, the heating element includes a resistance wire. The resistance wire can be used to provide Joule heating. When a current is run through the resistance wire the wire's temperature increases thereby providing heat. The amount of heat produced is proportional to the product of the wire's resistance and the square of the current. Preferably, the wire is provided or molded within a polymer such that heating element comprises a circuit, which may be molded within the polymer. The polymer can be a separate film, wherein the heating element is molded into the polymer film. This film can then be provided between the, preferably radio-transmissive, substrate and the, preferably radio-transmissive, decorative coating. Consequently, the heating element is protected from the environment by the, preferably radio-transmissive decorative coating, but is close to the surface to provide rapid de-icing, In case of an element in form of a radome like the radio-transmissive substrate, the polymer providing the film for the heating element needs to be radio-transmissive. As such the polymer film can be made out of any compatible polymer, such as those used for the radio-transmissive substrate. Accordingly, the polymer for the film may be selected from: Acrylonitrile Ethylene Styrene (AES), Acrylonitrile butadiene styrene (ABS), acrylonitrile styrene acrylate (ASA), Polyamide (PA), polybutylene terephthalate (PBT), Polycarbonate (PC), Polyethylene (PE), Polyethylene Teraphthalate (PET), Poly(methyl methacrylate) (PMMA), Polyoxymethylene (POM), Polypropylene (PP), Polyurethane (PU), PolyVinyl-Chloride (PVC), high-flow AES, acrylonitrile-(ethylene-propylene-diene)-styrene (AEPDS), blends of thermoplastics, or PC-ABS blended thermoplastic. In some embodiments, the polymer film is Polycarbonate or Polypropylene. Indeed, in some embodiments the heating element is provided in the, preferably radio-transmissive, substrate.

To be suitable for use as a radome, the decorative element of the present invention does not need to be completely radio transparent and therefore can have a permissible level of radio wave attenuation. In some specific embodiments, the decorative radome has radio wave signal attenuation less than 4 dB (two way) across a signal path, or less than 2 dB (one way), or more preferably less than 2 dB (two way) across a signal path, or less than 1.5 dB, preferably less than 1 dB (one way) across a signal path within a frequency range of 20 to 81 GHz, or 76 to 81 GHz, or 76 to 77 GHz, or when the frequency is about 77 GHz, or about 79 GHz or about 81 GHz.

To achieve sufficient radio-transparency the decorative layer, consisting of a metal, or consisting of an alloy including a metal, should not be substantially electrically conductive. Consequently, in some embodiments the decorative layer has a sheet resistivity greater than $10^6$ ohms per square (Ω/□).

The optimal thickness of the radio-transmissive substrate can influence the attenuation of a traversing radio wave. As the decorative radome of the present invention may be used with radar systems which emit frequencies between 76 and 81 GHz, the optimal thickness of a polycarbonate substrate, is a multiple of about 1.15 mm. Therefore, in some embodiments the thickness of the radio-transmissive substrate is about 1.15 mm, 2.3 mm or 2.45 mm. In some embodiments, particularly for use with vehicles, the radio-transmissive substrate is between 2 mm and 2.6 mm thick. This thickness also provides advantages with weigh, cost, moldability and resilience amongst other design considerations.

The present invention further provides a radar system including a radio wave transmitter, a radio wave receiver and a decorative radome as described herein. The optimal thickness of the radio-transmissive substrate will be dependent on the wavelength of the radio wave emitted from the radio wave transmitter and the dielectric real permittivity of the substrate. Therefore, in some embodiments, the thickness of the radio-transmissive substrate of the radome is a multiple of $$\frac{\lambda i}{2}$$

wherein λi is the wavelength through the substrate of a radio wave transmitted from the radio wave transmitter. Preferably the radio wave transmitter transmits radio waves in the frequency between 20 GHz and 81 GHz, or from 76 to 81 GHz, or from 76 to 77 GHz, or at about 77 GHz, or at about 79 GHz or at about 81 GHz.

BRIEF DESCRIPTION OF DRAWINGS

Certain embodiments are illustrated by the following figures. It is to be understood that the following description is for the purpose of describing particular embodiments only and is not intended to be limiting with respect to the description.

DETAILED DESCRIPTION

Figure 1:
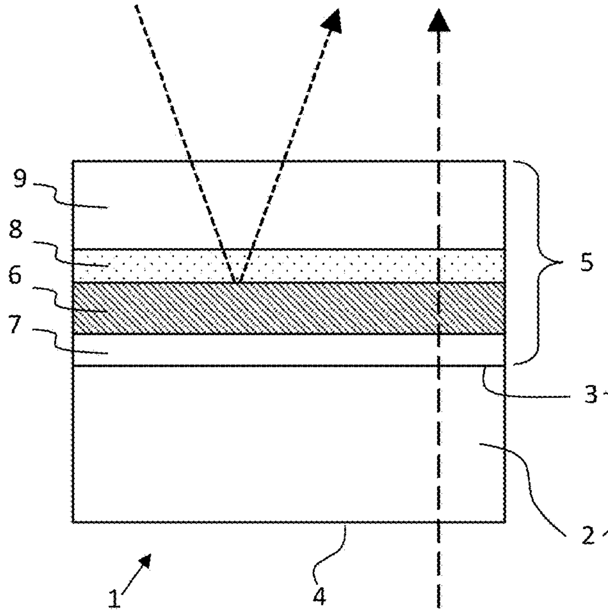
FIG. 1 illustrates an embodiment of the decorative element, especially radome, of the present invention and indicates the reflection of visible light (short dashes) from the decorative layer while radio waves (long dashes) can traverse the radome.

Throughout the specification reference will be made to layers in relation to the plastic substrate and in relation to each other. Therefore, in order to define the spatial relationship of the coating in relation to the substrate, and the spatial relationship between layers included in the coating, the following terminology will be used.

"First side" is to be understood as the side of the substrate, coating, or specific layer which in-use faces away from a radio wave transmitting or receiving device. As such, the first side is the side which is facing toward the external environment. In the specific context of a vehicle, this would be the visible outside of the vehicle.

"Second side" is to be understood as the opposing side to the first side. In an in-use context this is the side facing toward the radio wave transmitting device, or receiving device. Typically, the second side is not visible when the element, especially radome, is used.

"First surface" is to be understood to refer to the surface on the first side of a substrate, coating, or specified layer.

"Second surface" is to be understood to refer to the surface on the second side of a substrate, coating, or specified layer.

The term "reflective" (without qualification such as "radio wave") refers to reflection of visible light, typically in the nanometre wave length and frequency range of 400 to 800 THz.

A reference to radio wave throughout the specification, typically refers to frequencies of 10 MHz to 3000 GHz. In preferred embodiments, and in relation to automotive vehicles, the frequency is typically 1000 MHz to 100 GHz. In some specific embodiments in relation to radomes for vehicles, the frequency is 21 GHz to 81 GHz, or about 24 GHz to about 79 GHz or about 77 GHz to about 79 GHz, or about 24 GHz, about 77 GHz or about 79 GHz. Further preferred frequencies are in the range of about 1575 MHz±200 MHz. Use of about in this context does not exclude explicit limitation to specified band (e.g. 24 GHz) but does envisage the typical band spread used in the applications such as automotive radar systems. These band widths are known in the art for example see Hasch et al. "Millimeter-Wave Technology for Automotive Radar Sensors in the 77 GHz Frequency Band", IEEE Transactions on Microwave Theory and Techniques (Volume: 60, Issue: 3, March 2012)

The term "transparent" and "opaque" when used without a qualifier (such as "radio-wave" or "radar") refers to visually transparent or opaque, and hence is a reference to transmission or absorption of visible light as defined above.

As discussed above, the decorative element, especially radome, of the present invention comprises a first surface coating, being a coating on the first side and in contact with the first surface of a substrate. The first surface coating may include multiple "stacked" layers, with each layer having a first surface and a second surface, with the first surface of one layer abutting the second surface of an overlaying layer, which itself has a first surface. Resultantly, the use of the terms "first side", "second side", "first surface" and "second surface" need to be read and interpreted in the relative context for which they are used.

A decorative element, especially radome (1), in accordance with the present invention is illustrated in FIGS. 1 to 6 and includes: a, preferably radio-transmissive, substrate (2) having a first surface (3) on a first side and a second surface (4) on a second side; a, preferably radio-transmissive, decorative coating (5) on the first surface (3) of the, preferably radio-transmissive, substrate (2), the, preferably radio-transmissive, decorative coating (5) including a decorative layer (6) consisting of a metal or consisting of an alloy including a metal.

Figure 2:
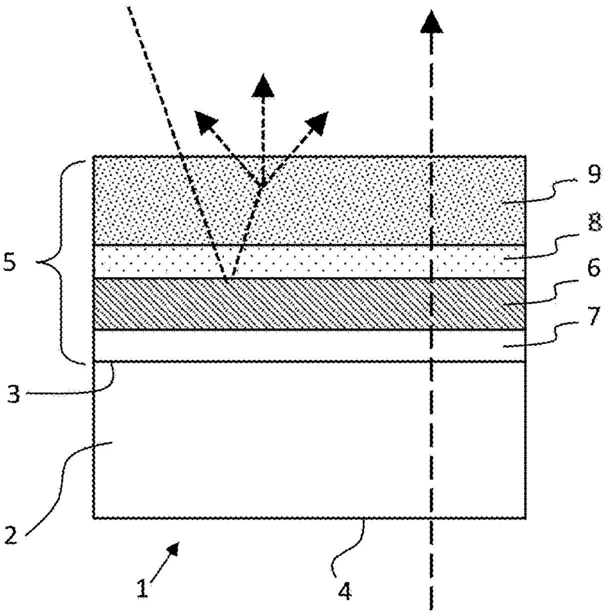
FIG. 2 illustrates an embodiment of the decorative element, especially radome, of the present invention including an upper coating which diffuses visible light (short dashes) thereby providing a satin look.
Figure 3:
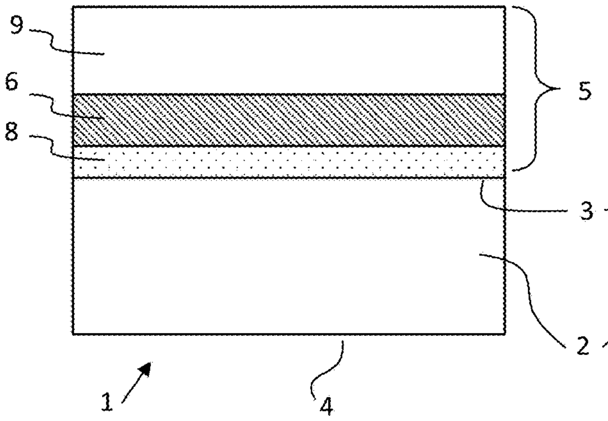
FIG. 3 illustrates an embodiment of the decorative element, especially radome, of the present invention including an intermediate dielectric layer between the substrate and the decorative layer.

As illustrated in FIGS. 1 and 2, the element, especially radome, of the present invention permits radio waves to traverse the element, especially radome, (long dashes) while some visible light (short dashes) is reflected off the decorative layer (6), such that the appearance of the element, especially radome (1), is coloured or reflective.

Radio-Transmissive Substrate

The element, especially radome (1), of the present invention is for use in the intended radio wave path of a transmitter and/or a receiver for a radio communication system or radio detection and ranging system, as such the design of the element, especially radome, may be dictated by its intended use. Consequently, the selection of materials for the radio-transmissive substrate (2) will be, in part, dictated by design considerations which are not solely based on the degree of radio-transparency such as robustness, moldability, resistance to extreme temperatures and cost. As such, the radio-transmissive substrate (2) can be any substrate which attenuates the desired radio wave frequency at an acceptable level for the desired application. As is understood, all substrates will attenuate and reflect radio-waves to an extent.

However, in some embodiments of the invention, the substrate is a polymer, preferably a synthetic polymer. As would be understood in the art, radio-transmissive substrates are typically resistant to electrical conductivity (i.e. are insulating or are a dielectric). Suitable polymers for the substrate (2) include (but are not limited to): Acrylonitrile Ethylene Styrene (AES), Acrylonitrile butadiene styrene (ABS), acrylonitrile styrene acrylate (ASA), Polyamide (PA), polybutylene terephthalate (PBT), Polycarbonate (PC), Polyethylene (PE), Polyethylene Teraphthalate (PET), Poly(methyl methacrylate) (PMMA), Polyoxymethylene (POM), Polypropylene (PP), Polyurethane (PU), PolyVinyl-Chloride (PVC), high-flow AES, acrylonitrile-(ethylene-propylene-diene)-styrene (AEPDS), blends of thermoplastics, or PC-ABS blended thermoplastic. In some embodiments, the radio-transmissive substrate (2) will be formed of Polycarbonate or Polypropylene.

Decorative Coating

The decorative layer (6) of the decorative coating (5) is preferably a reflective layer, and includes any suitable metal or alloy including a metal that provides the desired reflectivity, or appearance while being preferably radio-transmissive. In some embodiments, the metal which forms the decorative layer (6) is a transition metal. In some embodiments, the metal which forms the decorative layer (6) is indium or tin.

In some embodiments, wherein the decorative layer (6) is an alloy including a metal, the alloy comprises a metal selected from the group of: aluminium, tin, indium or chromium. In some embodiments, the decorative layer (6) includes a metalloid. Metalloids include silicon, boron, germanium, arsenic, antimony and/or tellurium. In specifically preferred embodiments, the metalloid is germanium or silicon. In a most preferred embodiment, the metalloid is germanium. Suitable metalloid/metal alloys include: germanium and aluminium and/or silicon; or germanium and silicon; or germanium and silver and, optionally, silicon; or germanium and indium and, optionally, silicon, or chromium and germanium and/or silicon. In some express embodiments, the alloy is not silicon and aluminium.

In embodiments where the metal alloy includes germanium the concentration of germanium may be at least 25 wt % germanium, or at least 40 wt % germanium, or at least 45 wt % germanium, or at least 50 wt % germanium, or at least 55 wt % germanium.

Methods are known in the art for providing thin film layers such as the decorative layer (6) consisting of a metal or consisting of an alloy including a metal. However, preferably, the decorative layer (6) is deposited by Physical Vapour Deposition (PVD). Suitable PVD methods include magnetron sputtering and evaporation, which may be resistive thermal evaporation or electron-beam evaporation. In some embodiments, the decorative layer (6) is deposited additionally or alternatively by magnetron sputtering and/or reactive sputtering, especially including the use of reactive gases and/or monomers, preferably to create a decorative layer (6) in form of a compound.

In some embodiments, the decorative coating (5) includes multiple layers, with the decorative layer (6) being abutted by one or more additional layer(s). In some embodiments, the multiple layers of the decorative coating (5) includes a bonding layer. Typically, the bonding layer will directly abut the substrate and will therefore form the first layer in a multi-layer stack. For example, a hard coat layer (7) may be provided to the first surface (3) of the substrate (2) prior to the addition of further layers in the decorative coating. Such a hard coat layer (7) acts to improve the bonding strength of the decorative layer (6) to the substrate (2) thereby reducing the likelihood of delamination of the coating (5) from the substrate (2). The hard coat (7) may also influence the overall residual stress of the, preferably radio-transmissive, decorative layer (5) and as such may act, at least in part, as a stress controlling layer.

In some embodiments, the, preferably radio-transmissive, decorative coating (5) includes a stress controlling layer which may underlie or overlie the, preferably radio-transmissive, decorative layer (6). Therefore, as illustrated in FIGS. 1, 2, 4, 5 and 6 a stress controlling layer (8) is on the first side (preferably the first surface) of the decorative layer (6).

Figure 4:
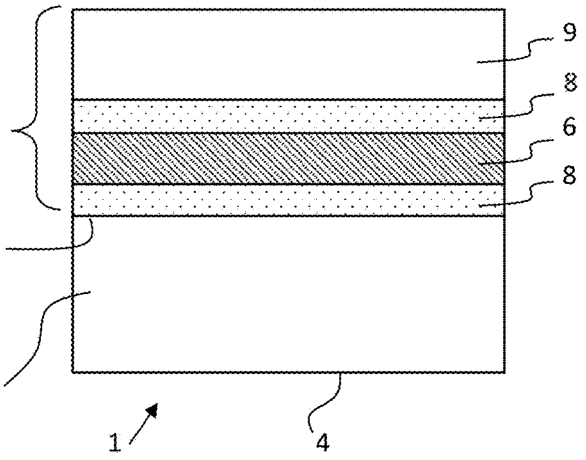
FIG. 4 illustrates an embodiment of the decorative element, especially radome, of the present invention including dielectric layers above and below the decorative layer.
Figure 5:
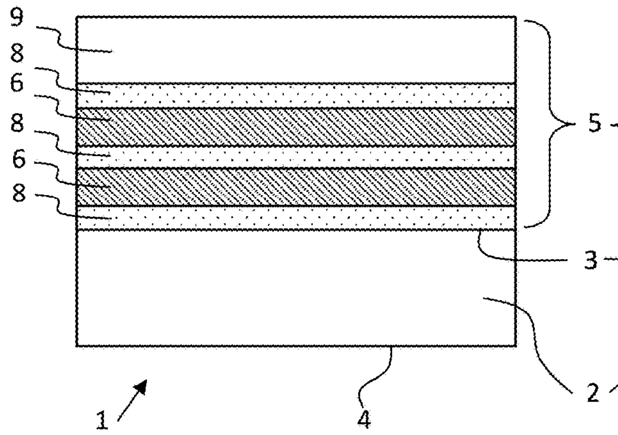
FIG. 5 illustrates an embodiment of the decorative element, especially radome, of the present invention including a multi-stack decorative coating with multiple decorative layers and multiple dielectric layers.

In some embodiments, as illustrated in FIGS. 4 and 5, the, preferably radio-transmissive, decorative coating may include a stress controlling layer (8) below the decorative layer (6). In these embodiments, where the stress controlling layer (8) is between the, preferably radio-transmissive, substrate and the decorative layer (6). The stress controlling layer can be positioned above a hard coat (7) on the first surface (3) of the, preferably radio-transmissive, substrate (2) and below the decorative layer (6).

In some embodiments, the multiple layers of the, preferably radio-transmissive, decorative coating (5) include at least one dielectric layer, in the exemplified embodiments this dielectric layer is the stress controlling layer (8). However, the dielectric layer may also alter the visual characteristics of the decorative coating (5). This is particularly relevant in embodiments with multiple decorative layers (6) or an upper most dielectric layer (8) (FIGS. 1, 2, 4, 5 and 6). Suitable dielectrics for thin film deposition are known in the art and include oxides such as hafnium dioxide ($HfO_2$), aluminium oxide ($Al_2O_3$), zirconium dioxide ($ZrO_2$), titanium dioxide ($TiO_2$) and silicon dioxide ($SiO_2$). In a preferred form, the dielectric layer is silicon dioxide ($SiO_2$).

In some embodiments, the, preferably radio-transmissive, decorative coating (5) includes at least one layer consisting of a metal or an alloy including a metal (6) between at least two dielectric layers (8) (see FIGS. 4 and 5). Additionally, in the embodiment illustrated in FIG. 5, the decorative coating (5) includes two decorative layers (6) sandwiched between alternating dielectric layers (8). These multilayer stacks allow for tuning of the, preferably radio-transmissive, decorative coating (5), including its colour and residual stress.

Different visual appearances may be achievable by providing a, preferably radio-transmissive, decorative coating which includes multiple stacked layers. Examples of possible multi-layer stacks include:

$SiO_2$:AlGe:$SiO_2$:AlGe:$SiO_2$
$SiO_2$:CrGe:$SiO_2$:CrGe:$SiO_2$
AlGe:$SiO_2$:AlGe:$SiO_2$
CrGe:$SiO_2$:CrGe:$SiO_2$
AlSi:$SiO_2$:AlSi:$SiO_2$

Such visual stacks could include a stress controlling layer to optimise the residual stress of the, preferably radio-transmissive, decorative coating (5) within a desired window. Preferably this stress window is greater than or equal to −120 MPa, or greater than or equal to −70 Mpa, or greater than or equal to −50 Mpa, or greater than or equal to −40 MPa. Suitable materials for controlling stress include a dielectric layer, such as a further silicon dioxide layer, which can be tuned to provide a desired stress range (e.g. by altering thickness and deposition conditions) without altering the visual appearance of the decorative coating.

Protective Hard Coat

The inherent function of a cover element, especially a radome, is to provide protection to a system, especially radar equipment, from the environment. As such, the element, especially radome, is susceptible to degradation, wear and damage. This exposure is further amplified when the element, especially radome, is positioned at the front of a vehicle that is routinely exposed to relatively high speeds, abrasives, projectiles as well as chemicals used for cleaning.

Consequently, in preferred embodiments of the present invention the outer most layer of the decorative coating (5) is a protective hard coat (9). In this respect, a coating that is said to be a "hard coat" is a coating that is harder or more resilient (e.g. chemical resilient) than the underlying layers, whereby it increases the abrasion resistance, resistance to environmental damage or chemical resistance of element, especially radome.

As discussed above, intermediate layers of the decorative coating (5) can also include a hard coat layer (7). This may be a hard coat of the same material, or of different material, to the protective hard coat (9).

In some embodiments the hard coat(s) increase the abrasion resistance of the surface. Abrasion resistance can be measured through standard tests such as ASTM F735 "Standard Test Method for Abrasion Resistance of Transparent Plastics and Coatings Using the Oscillating Sand Method", ASTM D4060 "Standard Test Method for Abrasion Resistance of Organic Coatings", by the Taber Abrader, or by using the well-known Steelwool Test.

It is a requirement for many exterior automotive components, such as decorative elements, especially radomes, to be "chemically resistant", which is a reference to an ability to withstand exposure to normal solvents such as diesel fuel, petroleum, battery acid, brake fluid, antifreeze, acetone, alcohol, automatic transmission fluid, hydraulic oil and ammonia based window cleaners. In this respect, it will be appreciated that a hard coat (7, 9) ideally provides at least the first surface of the element, especially radome, with such chemical resistance.

A hard coat (7, 9) is preferably formed from one or more abrasion resistant layers and may include a primer layer that bonds well to the underlying layer and forms a preferable surface for subsequent upper layers. The primer layer may be provided by any suitable material and may for example be an organic resin such as an acrylic polymer, a copolymer of an acrylic monomer and methacryloxysilane, or a copolymer of a methacrylic monomer and an acrylic monomer having a benzotriazole group or benzophenone group. These organic resins may be used alone or in combinations of two or more.

The hard coat layer(s) (7, 9) is/are preferably formed from one or more materials selected from the group consisting of an organo-silicon, an acrylic, a urethane, a melamine or an amorphous $SiO_xC_yH_z$.

Commercially available hard coatings include Momentive products: PHC-587B, PHC-587C2, PHCXH100P, AS4700F, UVHC 5000 (which is UV cured) and the two-part product comprising a primer of PR660 (SDC Technologies), subsequently coated with MP101 (SDC Technologies).

Most preferably, the hard coat layer(s) (7, 9) is/are an organo-silicon layer, due to its superior abrasion resistance and compatibility with physical vapour deposited films. For example, a hard coat layer comprising an organo-silicon polymer can be formed of a compound selected from the following compounds: trialkoxysilanes or triacyloxysilanes such as, methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltracetoxysilane, vinyltrimethoxyethoxysilane, phenyltrimethoxysilane, phenyltriethoxysilane, phenyltriacetoxysilane, gamma-chloropropyltrimethoxysilane, gamma-chloropropyltriethoxysilane, gamma-chloropropyltripropoxysilane, 3,3,3-trifluoropropyltrimethoxysilane gamma-glycidoxypropyltrimethoxysilane, gamma-glycidoxypropyltriethoxysilane, gamma-(beta-glycidoxyethoxy)propyltrimethoxysilane, beta-(26,4-epoxycyclohexyl)ethyltrimethoxysilane, beta-(26,4-epoxycyclohexyl)ethyltriethoxysilane, gamma-methacryloxypropyltrimethyoxysilane, gamma-aminopropyltrimethoxysilane, gamma-aminopropyltriethoxysilane, gamma-meraptopropyltrimethoxysilane, gamma-mercaptopropyltriethoxysilane, N-beta(aminoethyl)-gamma-aminopropyltrimethoxysilane, beta-cyanoethyltriethoxysilane and the like; as well as dialkoxysilanes or diacyloxysilanes such as dimethyldimethoxysilane, phenylmethyldimethoxysilane, dimethyldiethoxysilane, phenylmethyldiethoxysilane, gamma-glycidoxypropylmethyldimethoxysilane, gamma-glycidoxypropylmethyldiethoxysilane, gamma-glycidoxypropylphenyldimethoxysilane, gamma-glycidoxypropylphenyldiethoxysilane, gamma-chloropropylmethyldimethoxysilane, gamma-chloropropylmethyldiethoxysilane, dimethyldiacetoxysilane, gamma-methacryloxypropylmethyldimethoxysilane, gamma-metacryloxypropylmethyldiethoxysilane, gamma-mercaptopropylmethyldimethoxysilane, gamma-mercaptopropylmethyldiethoxysilane, gamma-aminopropylmethyldimethoxysilane, gamma-aminopropylmethyldiethoxysilane, methylvinyldimethoxysilane, methylvinyldiethoxysilane and the like.

The hard coat layer(s) (7, 9) may be coated by dip coating in liquid followed by solvent evaporation, or by plasma enhanced chemical vapour deposition (PECVD) via a suitable monomer, flow coating or spray coating. To improve the abrasion resistance of the hard coats (7, 9), subsequent coatings of the hard coat may be added, preferably within a 48-hour period so as to avoid aging and contamination of the earlier coatings.

The thickness of the hard coat layer(s) (7, 9) is preferably selected to assist in providing adequate abrasion resistance, or to improve the bonding of the subsequent layers to the, preferably radio-transmissive, substrate (2). The appropriate abrasion resistance will be determined by the required application and the demands of the user. In some applications, adequate abrasion resistance may be regarded as being a Bayer abrasion ratio of 5 with respect to an uncoated, preferably radio-transmissive, substrate (2) (such as a polycarbonate), or alternatively by a Taber abrasion test with delta haze less than 15% after testing with a 500 g load and CS10F wheel at 500 cycles, (% haze being measured as per ASTM D1003). With these requirements met, when an organo-silicon is used as a hard coat layer (7, 9), the thickness of the hard coats is preferably at minimum of at least 1 μm thick on average and/or has a maximum thickness of 25 μm thick. In some embodiments, the thickness of the hard coat layer (7) provided to the first surface (3) is from 1 μm to 15 μm. In some embodiments, the thickness of the of the hard coat layer (7) provided to the first surface (3) is from 2 μm to 10 μm, or from 2 μm to 9 μm. In some embodiments, the thickness of the protective hard coat layer (9) is from 5 μm to 25 μm. In some embodiments, the thickness of the of the protective hard coat layer (9) is from 8 μm to 20 μm, or from 8 μm to 16 μm.

The protective hard coat (9) can also modify the appearance of the decorative layer (6). As illustrated in FIG. 2, the protective hard coat (9) includes an additive to diffuse reflected visible light. Consequently, the decorative layer (6) has an outward "satin" appearance.

Further coatings to those discussed above may be applied to the first surface of the decorative coating (5) to modify the surface properties of the element, especially radome (1). For example, a cap layer may also be provided by materials having characteristics, including: hydrophobic, hydrophilic, lipophobic, lipophilic and oleophobic or combinations thereof.

Coating Residual Stress

The importance of residual stress, the use of interfacing layers in controlling residual stress, and determination of residual stress parameters are described in WO2011/075796 and U.S. Pat. No. 9,176,256 B2, each entitled "PLASTIC AUTOMOTIVE MIRRORS", and each of which is hereby incorporated by reference in its entirety for all purposes.

A highly stressed interface between layers of the decorative coating (5), and between the decorative coating (5) and the substrate (2), should ideally be avoided to prevent a high region of stress becoming a locus for failure. For example, a compressive layer pulls in one direction against a tensile layer pulling in the opposite direction, generating a high interfacial stress. It has been found that by controlling this interfacial stress (reducing it) the resilience of the decorative coating (5) can be improved.

The present inventors have thus found that it is preferred to control internal stress parameters of the decorative coating (5) such that the differential stress is minimised. The present inventors have also found that it is further preferred to control internal stress parameters of a decorative coating (5) such that the net residual stress is above −120 MPa. In some embodiments, the net residual stress is above −70 Mpa, or above −50 Mpa, or above −40 MPa. In some preferred embodiments, the net residual stress is neutral or is tensile (i.e. above 0 MPa). With particular regard to decorative coatings (5) including a decorative layer (6) of aluminium and germanium, the net residual stress will be above −120 MPa, or above −50 Mpa, or above −40 MPa. In embodiments of the decorative coatings (5) where the decorative layer (6) is chromium and germanium the net residual stress will preferable be above −70 Mpa, preferably up to +170 Mpa.

In terms of being able to control internal stress parameters, ideally the stress of the entire coating system will be controlled, in both magnitude and mode. The term "residual stress" is to be taken as meaning the combined stress of the multiple layers which form the decorative coating (5), which may, or may not, include the protective hard coat (9). In preferred embodiments the residual stress is measured or calculated with the protective hard coat (9).

To manufacture decorative element, especially radomes in a manner that permits control of the measured residual stress within the decorative coating (5), the inventors have determined that is helpful for the stress ranges of the individual layers to be known, so that when they are combined, they result in the desired measured residual stress.

Radome Attenuation and Technical Characteristics

The decorative radome of the invention does not substantially attenuate electromagnetic frequencies of 10 MHz to 3000 GHz. Specifically, in some embodiments, the radome has a radar attenuation less than 2 dB one-way (4 dB two-way) across a signal path, or preferably 1 dB one-way (2 dB two-way) across a signal path. Further, the decorative layer (6) comprising a metal or an alloy of metal and a metalloid, has a sheet resistivity greater than $10^6$ ohms per square (Ω/□) in situ. The surface resistivity of the decorative layer (6) can be determined using a four-point method, using a four-point probes in accordance with JIS K7194.

To minimise refraction of the radar signal, as it passes through the radome (1), the front and rear face should be parallel or substantially parallel. Further, the interior of the radome (1) should have no voids, air bubbles or significant changes in material density such as water ingress, and the decorative layer (5) should be of a uniform thickness.

Radio wave attenuation and reflectance will be determined by the requirements of the user, the application, the frequency used, and the equipment being used. However, in some embodiments there will be a maximum of 2 dB one-way (4 dB two-way) attenuation at a specific operating frequency at 1.575 GHz, at 2.0 GHz and/or between 76 and 81 GHz. In some embodiments, there will be less than 2 dB, preferably less than 1.5 dB one-way attenuation at 1.575 GHz, 2.0 GHz, 24 GHz, 77 GHz or 79 GHz. In some embodiments, there will be a maximum of 1 dB one-way (4 dB two-way) attenuation at a specific operating frequency between 76 and 81 GHz. In some embodiments, there will be less than 1 dB one-way attenuation at 1.575 GHz, 2.0 GHz, 24 GHz, 77 GHz or 79 GHz.

Radar Systems

Figure 7:
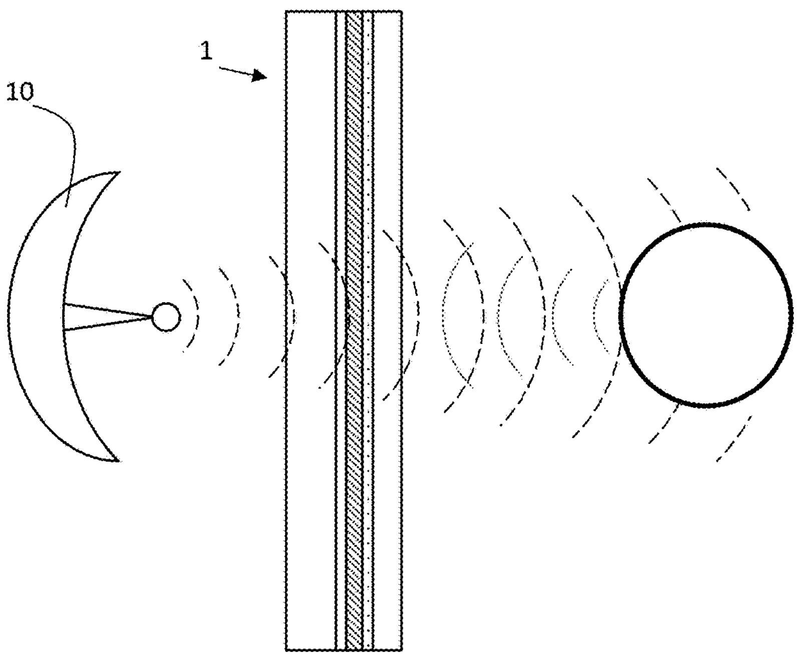
FIG. 7 illustrates a radar system including a radio wave transmitter/receiver and an element in form of a radome in accordance with the present invention.

In some embodiments, the present invention provides a radar system as illustrated in FIG. 7 including a radio wave transmitter (10), a radio wave receiver (10) and a decorative radome (1) as describe herein.

The radome (1) can sit in the radio wave path of both the radio wave receiver and transmitter (which may be integrated into one device) or there may be a radome associated with the transmitter and another radome associated with the receiver.

The substrate attenuates the radio wave signal as it traverses the radome (1). A portion of this attenuation is a product of the reflection of the radio wave signal from the first surface (3) of the substrate (2) as the radio waves emanating from the transmitter traverse the radome. Consequently, the attenuation, as a result of reflection, is determined by the thickness of the substrate (2) (and coating) in relation to the wave length of the radio wave signal. The wave length of the radio wave through the substrate varies with the dielectric real permittivity of the substrate. Therefore, the substrate thickness providing minimum attenuation is determined by the equation $$m\frac{\lambda i}{2},$$

where m is an integer and λi is the wavelength through the substrate of the radio wave transmitted from a radio wave transmitter for which the radome is designed. Consequently, in some embodiments the thickness of the radome substrate is a multiple of $$\frac{\lambda i}{2}.$$

Radar systems in vehicles typically use microwaves to provide line-of-sight detection of objects. The three frequencies currently mostly being used for automobiles are 24 GHz, 77 GHz and 79 GHz. Recently, 77 GHz and 79 GHz have become the dominant frequency used as these frequencies offer improved range and resolution compared to the 24 GHz frequency. Specifically, 77 GHz can differentiate objects at a 3 times higher resolution than 24 GHz while using an antenna size three times less in height and width (with only ninth of the area). But also radar systems using a frequency of 1.575 GHz and/or 2.0 GHz are getting more and more common.

Radar systems using the 24 GHz could utilise both a narrow band (NB) spanning 200 MHz from 24.05 GHz to 24.25 GHz and an ultra-wide band (UWB) spanning 5 GHz, from 21.65 GHz to 26.65 GHz.

Due to spectrum regulations and standards developed by the European Telecommunications Standards Institute (ETSI) and US Federal Communications Commission (FCC), the use of the UWB band will be phased out by the year 2022 (the "sunset date") in both Europe and the U.S.

The 24 GHz NB and UWB have been replaced with frequencies from 71 to 81 GHz, with the 76 to 77 GHz range representing long range radar (LRR) and the 77 to 81 GHz representing short range radar (SRR). The 77 to 81 GHz range provides up to 4 GHz of sweep bandwidth, which is much larger than the 200 MHz available in the 24 GHz NB.

In some embodiments, the radome is designed for use in, or is used in, a radar system wherein the radio wave transmitter (10) transmits radio waves in the frequency between 20 GHz and 81 GHz. In some embodiments, the radome is designed for use in, or is used in, a radar system wherein the radio wave transmitter transmits radio waves in the frequency between 76 and 81 GHz, or from 76 to 77 GHz, or is about 77 GHz, or is about 79 GHz.

To minimise attenuation, in some embodiments of the decorative radome, the substrate is between 2 mm and 2.6 mm thick. In some embodiments, the substrate is about 1.15 mm, 2.3 mm or 2.45 mm thick.

Heated Element, Especially Radome

Figure 6:
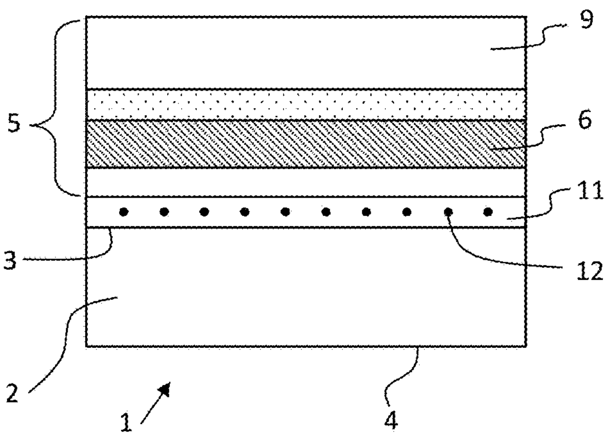
FIG. 6 illustrates an embodiment of the decorative element, especially radome, of the present invention including a heating element between the, preferably radio-transmissive, substrate and the decorative coating.

Radio waves are typically attenuated by water and are particularly attenuated by ice. Furthermore water and ice collection on a surface of a decorative element are not desired for other reasons, for example security and outer appearance. Therefore, it is desirable to prevent ice formation on the surface of the element, especially radome. Consequently, as illustrated in FIG. 6 the decorative element, especially radome, (1) of the present invention includes a layer including a heating element (11).

Suitable heating elements compatible for use with elements, especially radomes, are disclosed in DE102014002438A1, DE10156699A1, US20180269569A1 which are hereby incorporated by way of this reference in their entirety and for all purposes.

In preferred embodiments the heating element (11) comprises a radar-transparent polymer with an embedded resistance wire circuit (12), which may be embedded or molded within the heating element substrate (11) to form a network which substantially covers the element, especially radome.

The heating element (11) can be provided by a polymer film, containing the circuit (12) which can be provided between the, preferably radio-transmissive, substrate (2) and the decorative coating (5). As such the polymer film (11) will also need to be, preferably radio-transmissive. Consequently, the polymer film (11) can be made of any suitable polymer disclosed herein for the, preferably radio-transmissive, substrate (2). Therefore, the polymer film (11) may be made of a polymer selected from the group including (but are not limited to): Acrylonitrile Ethylene Styrene (AES), Acrylonitrile butadiene styrene (ABS), acrylonitrile styrene acrylate (ASA), Polyamide (PA), polybutylene terephthalate (PBT), Polycarbonate (PC), Polyethylene (PE), Polyethylene Teraphthalate (PET), Poly(methyl methacrylate) (PMMA), Polyoxymethylene (POM), Polypropylene (PP), Polyurethane (PU), PolyVinyl-Chloride (PVC), high-flow AES, acrylonitrile-(ethylene-propylene-diene)-styrene (AEPDS), blends of thermoplastics, or PC-ABS blended thermoplastic. In some embodiments, the polymer film (11) containing the circuit (12) will be formed of Polycarbonate or Polypropylene.

Alternatively, the circuit can be embedded in, or moulded into, the, preferably radio-transmissive, substrate (2) of the element, especially radome (1), such that the circuit (12) is provided within the, preferably radio-transmissive, substrate (2) without the requirement for an additional layer.

EXAMPLES

Substrate Attenuation

Substrate Thickness

To assess the influence of the substrate on attenuation of radio-wave at the 76-77 GHz band, bare (uncoated) polycarbonate samples at approximately 2, 2.3, 3, 4.5 and 6 mm (actual thickness 2.0. 2.33, 2.92, 4.42 and 5.84 mm) were obtained and assessed at a 10-degree tilt angle in a Rohde-Schwartz (R&S®) QAR System as per the manufacturer's instructions. The data was analysed and a line of best fit was then applied to the generated results. The assumed dielectric constant of polycarbonate at 77 Ghz is 2.8

Different dielectric substrates have different permittivity, which results in variations of the wave length of the radio wave across the substrate. Polycarbonate has a relative permittivity (Er) of 2.8 at 77 GHz, and therefore the calculated wavelength through the substrate is 2.328 mm.

Figure 8:
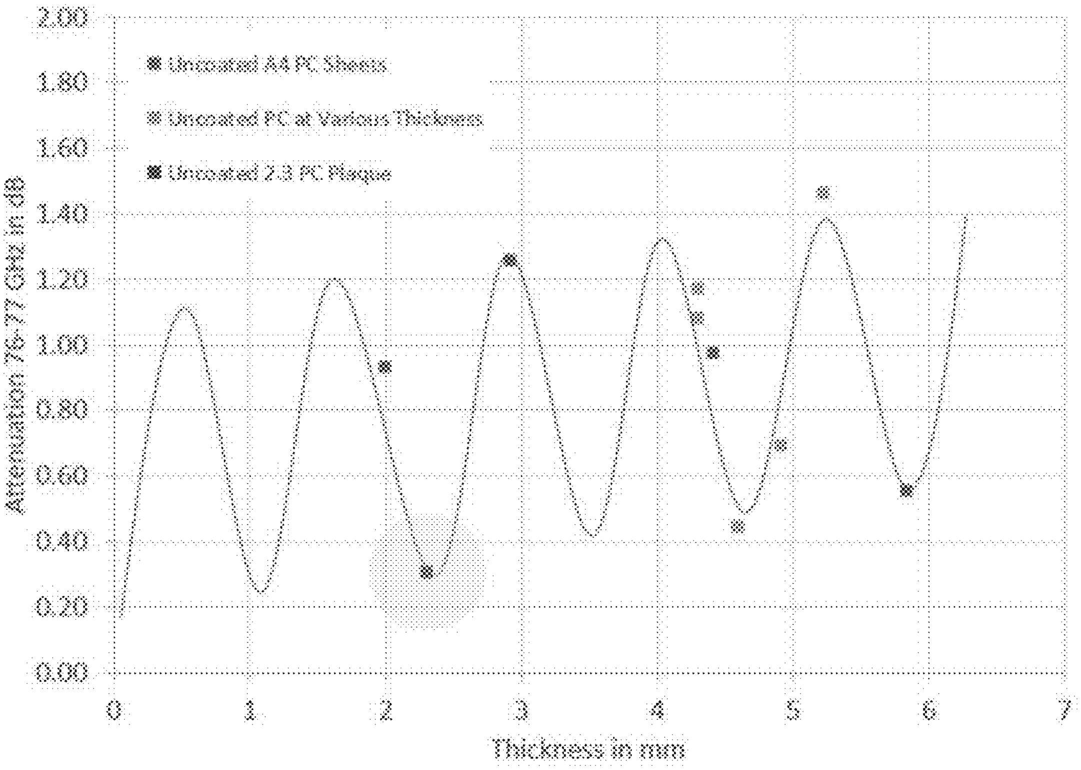
FIG. 8 illustrates the measured change in attenuation of 77 GHz radio waves through uncoated polycarbonate as a result of changes in polycarbonate thickness.

As can be seen in FIG. 8, the attenuation followed an inclined sine curve with attenuation cyclically being at a minimum with substrate thickness that were an integer multiple of half wave length (i.e. 0.5, 1, 1.5, 2, 2.5 etc. times the wavelength of the radio wave through the substrate), with maximum attenuation being a quarter wave length offset from the minimum (i.e. 0.75, 1.25, 1.75 etc. times the wavelength of the radio wave through the substrate). Further, the average attenuation across the sine curve increased as the thickness of the sheet increased.

In view of other design requirements for radome use on a vehicle, the optimal thickness was selected at 2.3 mm which provided minimal attenuation and appropriate robustness, stiffness and weight for use as an automotive body part.

Attenuation of 77 GHz Vs 79 GHz Radio Waves

To measure the attenuation at the common radio wave frequencies used in automotive radar systems, 2 mm (FIG. 9A) and 2.3 mm (FIG. 9B) polycarbonate substrates were assessed across the 76-81 GHz frequencies using the R&S® QAR System as per the manufacturer's instructions.

Figure 9:
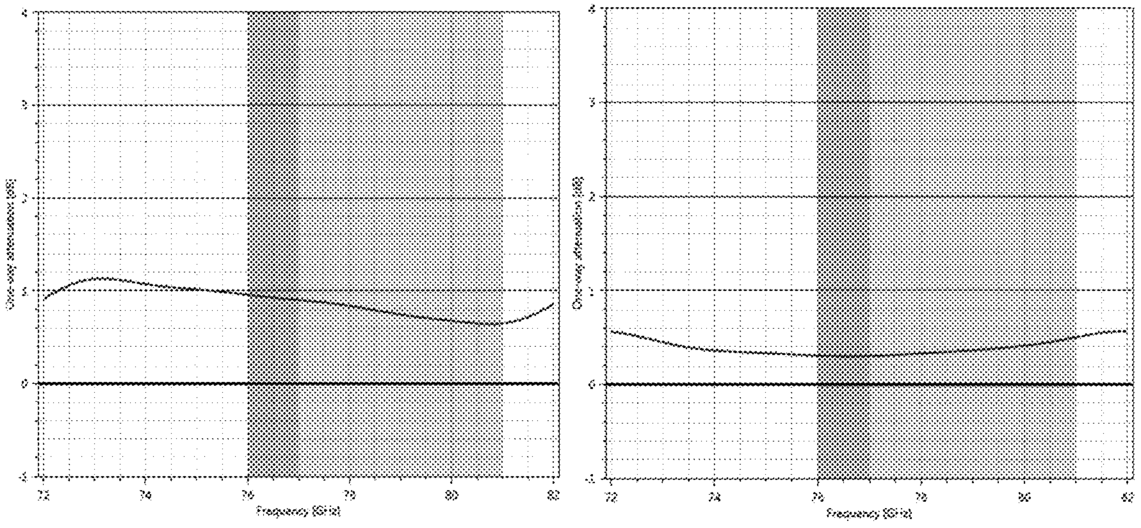
FIG. 9 illustrates average attenuation of radio waves of 76-77 GHz and 79-81 GHz across polycarbonate of 2 mm (A) and 2.3 mm (B) thickness.

As can be seen in FIG. 9A, the mean attenuation across the 76-77 GHz frequency was approximately 117% of the mean attenuation across the 76-81 GHz frequency when the polycarbonate substrate was 2 mm. By comparison, and as shown in FIG. 9B, the mean attenuation across the 76-77 GHz frequency was approximately 83% of the mean attenuation across the 76-81 GHz frequency when the polycarbonate substrate was 2.3 mm. As such, the percent variation between the 2 mm and 2.3 mm substrates was 17% when the mean attenuation across the 76-77 GHz frequency was compared to the mean attenuation across the 76-81 GHz frequency, albeit in opposing directions.

However, the difference in the real attenuation was only 0.06 dB when the substrate was 2.3 mm compared to 0.14 dB when the substrate was 2 mm. Therefore, 2.3 mm appears to be the most suitable choice for use with radar systems that use both the 77 GHz and 79 GHz band.

Gloss Metallic Look

A, preferably radio-transmissive, decorative polymer sheet was prepared with a gloss metallic look as per the following protocol.

Substrate Preparation

A polycarbonate substrate was prepared by applying a base hard coat layer of Momentive PHC587B using an automated dipcoating process consisting of a detergent wash, coarse rinse, fine rinse, extra fine rinse, drying, cooling and then dip coating and flash off. The dipcoating process was robotically controlled with a precise removal speed to control the thickness of the hardcoat. The first-surface hard coated substrate was left for 10 minutes to allow evaporation of the solvents until the surface was substantially tack-free. Subsequently, the first-surface coated substrate was cured for 71 minutes at 130° C. in a curing oven to provide a hard coated substrate.

Decorative Coating

A decorative coating including a layer of Aluminium and Germanium alloy or Indium and an overlying layer of silicon dioxide ($SiO_2$) was deposited in accordance with the following parameters:

TABLE 1

Decorative layer Coating Parameters

| | Pre-Treatment | Layer 1 (option 1) | Layer 1 (option 2) | Layer 2 |
|---|---|---|---|---|
| Glow discharge electrodes (S/S) | Power 3 kW | n/a | n/a | n/a |
| Dual rotatable Silicon Target (99.90% purity) | n/a | n/a | n/a | Power 18 kW |
| Aluminium/ Germanium (50/50 wt %) | n/a | Power 30 kW | n/a | n/a |
| Indium | n/a | n/a | Power 15 kW | n/a |
| Total Gas flow | 740 sccm Ar 100 sccm O2 | 330 sccm Ar | 300 sccm Ar | 100 sccm Ar 200 sccm O2 |
| RPM | 6 | 24 | 22 | 24 |
| Number of rounds | 12 | 10 | 5 | 20 |
| Base Pressure (mbar) | 8e−5 | 1.5e−5 | 1.0e−5 | 1.5e−5 |
| Run Pressure (mbar) | 9e−3 | 2e−3 | 2e−3 | 7e−4 |
| Thickness (nm) | n/a | 30 | 20 | 40 |

Protective Surface Coating—Clear Hard Coat

To provide a gloss finish and to protect the decorative coating, a protective surface hard coat layer of Momentive PHC587B was applied as the upper (protective hard coat) layer of the decorative coating. This was completed by an automated spraycoating process in a dedicated thin film coating spray booth. The first-surface coated substrate was left for 10 minutes to allow evaporation of the solvents until the surface was substantially tack-free. Subsequently, the first-surface coated substrate was cured for 71 minutes at 130° C. in a curing oven to provide a protective hard coated surface.

Bright Satin Metallic Look

A, preferably radio-transmissive, decorative polymer sheet was prepared with a satin metallic look as per the following protocol.

Substrate Preparation and Decorative Coating

A polycarbonate substrate was provided with a first surface hard coating and a decorative coating comprising a layer of an alloy of aluminium and germanium or Indium and a silicon dioxide layer as set out for the “Gloss Metallic Look” set out above.

Protective Surface Coating—Satin Hard Coat

To provide a satin metallic look a protective hard coat was applied which included an additive that resulted in diffusion of visible light. Specifically, the following parameters were used:

TABLE 2

Satin Hard Coat Deposition Parameters

| | Layer 1 |
|---|---|
| Material | Momentive PHC-587B + Tospearl 2000B at a 3.5% wt/wt |
| Deposition Method | Spray Coated and cured at 130° C. |
| Thickness (μm) | 8 to 16 |

Mechanical Testing

To assess if the decorative coated element, especially radome, would be sufficiently robust for use in automotive purposes a series of durability tests were performed on Gloss Metallic Look and Satin Metallic Look samples prepared as described above.

The tests performed and the outcomes are summarized in Table 3 below.

TABLE 3

Mechanical testing of coated samples

| TEST | DESCRIPTION | RESULT Gloss | RESULT Satin |
|---|---|---|---|
| Cross Hatch Adhesion | ISO 2409 using a single-blade cutting tool and 3M Scotch 8981 tape. Adhesion rating ≤ 1 | PASS | PASS |
| Abrasion - Steel Wool | A 30 cm long skeen of 0 grade steel wool folded into a 40 mm × 40 mm square pad and fitted to a Sutherland Ink Rub Tester. 1.9 kg of force is applied onto the surface of the radome for 75 cycles. | PASS | PASS |
| Abrasion - Scuff | A 30 cm long skeen of 0000 grade steel wool folded into a 40 mm × 40 mm square pad and fitted to a Sutherland Ink Rub Tester. 0.9kg of force is applied onto the surface of the radome for 10 cycles. | PASS | PASS |
| Stone Chip | Apply Test as per SAE J400<br>Max Ave<br>Sum (A + AB + B) < 30<br>Sum (AB + B) < 12<br>Sum (B) < 0.4<br>Rating letter / Size of stone chip:<br>A: Depth ≤ 1 mm<br>AB: Depth 1-2 mm<br>B: Depth 2-3 mm<br>C: Depth 3-6 mm<br>D: Depth ≥ 6 mm | PASS | PASS |
| Dry Heat | 1 hour at 115° C. | PASS | PASS |
| Thermal Shock | 200 Cycles −40° C. to 85° C, 1 hr/cycle | PASS | PASS |

TABLE 3-continued

Mechanical testing of coated samples

| TEST | DESCRIPTION | RESULT Gloss | RESULT Satin |
| --- | --- | --- | --- |
| Water Immersion | Sample immersed in in 40° C. water for 320 hours as per FLTM BI 104-1 | PASS | PASS |
| Condensate | 240 hours at 40° C. according to DIN EN ISO 6270-2 constant humidity | PASS | PASS |
| Salt Spray | Salt Spray for 480 hours as per ASTM B 117 | PASS | PASS |
| Russian Mud | Subject Sample to 'Russian Mud' solution as per NEW M4063. $CaCl_2$/Kaolin powder solution added to coated surface at 60° C. of 336 hours | PASS | PASS |

Coated Substrate Attenuation

Polycarbonate sheets of 2.0. 2.3, 2.92, 4.42 and 5.84 mm and were coated with either Gloss Metallic coating or a Satin Metallic coating as described above. To evaluate the effect of substrate thickness in reflection and attenuation of radar single in the 76-77 GHz band the coated polycarbonate sheets were assessed at a 10-degree tilt angle in a Rohde-Schwartz (R&S®) QAR System. The thickness of the applied decorative coating can be up to 0.03 mm thick providing a total thickness of 2.03. 2.33, 2.95, 4.45 and 5.87 mm. Results are shown in the Table 4 below:

TABLE 4

Substrate Attenuation (dB); Reflection (%)

| SubstrateThickness (mm) | Gloss Metallic Attenuation dB (average) | Gloss Metallic Reflection % (average) | Satin Metallic Attenuation dB (average) | Satin Metallic Reflection % (average) |
| --- | --- | --- | --- | --- |
| Aluminium Germanium alloy | | | | |
| 2.03 | 1.31 | 34 | 1.33 | 34 |
| 2.33 | 1.13 | 10 | 1.18 | 9 |
| 2.95 | 1.69 | 35 | 1.63 | 37 |
| 4.45 | 1.43 | 31 | 1.36 | 32 |
| 5.87 | 1.24 | 19 | 1.31 | 21 |
| Indium | | | | |
| 2.33 | 0.28 | 0 | 0.30 | 0 |

As can be seen above, the one-way attenuation and reflection of coated 2.33 mm polycarbonate did not significantly vary based on the coating applied. Further the best performing thickness was 2.33 mm with an attenuation of 1.1 dB and 1.18 dB (Gloss, Satin) and a reflection of 10% and 9% (Gloss, Satin). Indium performs significantly better than Aluminium Germanium.

Figure 10:
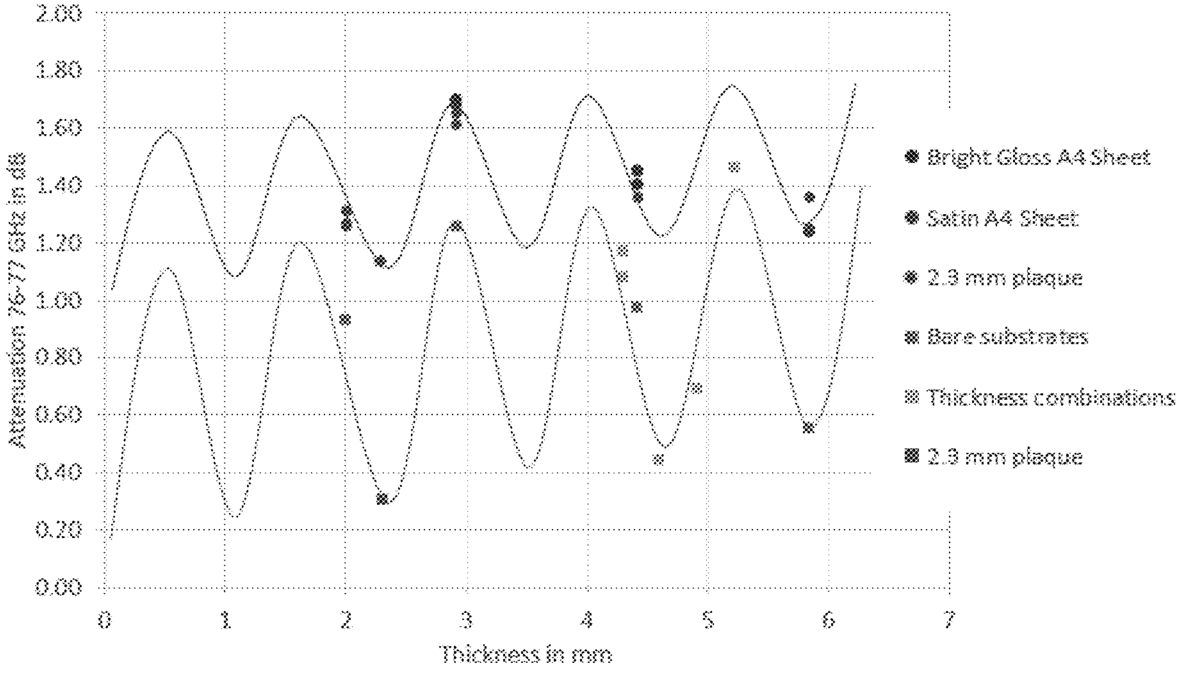
FIG. 10 illustrates the measured change in attenuation of 77 GHz radio waves through coated polycarbonate compared to uncoated polycarbonate as a result of changes in polycarbonate thickness.

The comparative attenuation of coated and uncoated substrates is illustrated in FIG. 10 (generated data including a sine curve line of best fit). As can be seen, the addition of a coating (Gloss or Satin) increases the attenuation. However, the attenuation at 2.33 mm is still at the levels compatible with that required for automotive radar systems.

Visual Characteristics

Two-millimetre and 2.3 mm polycarbonate substrates were coated to provide a Gloss Metallic Look or a Satin Metallic Look as described above and the visual characteristics at the centre of the coated substrates were measured via an illuminant A/2.

Figure 11:
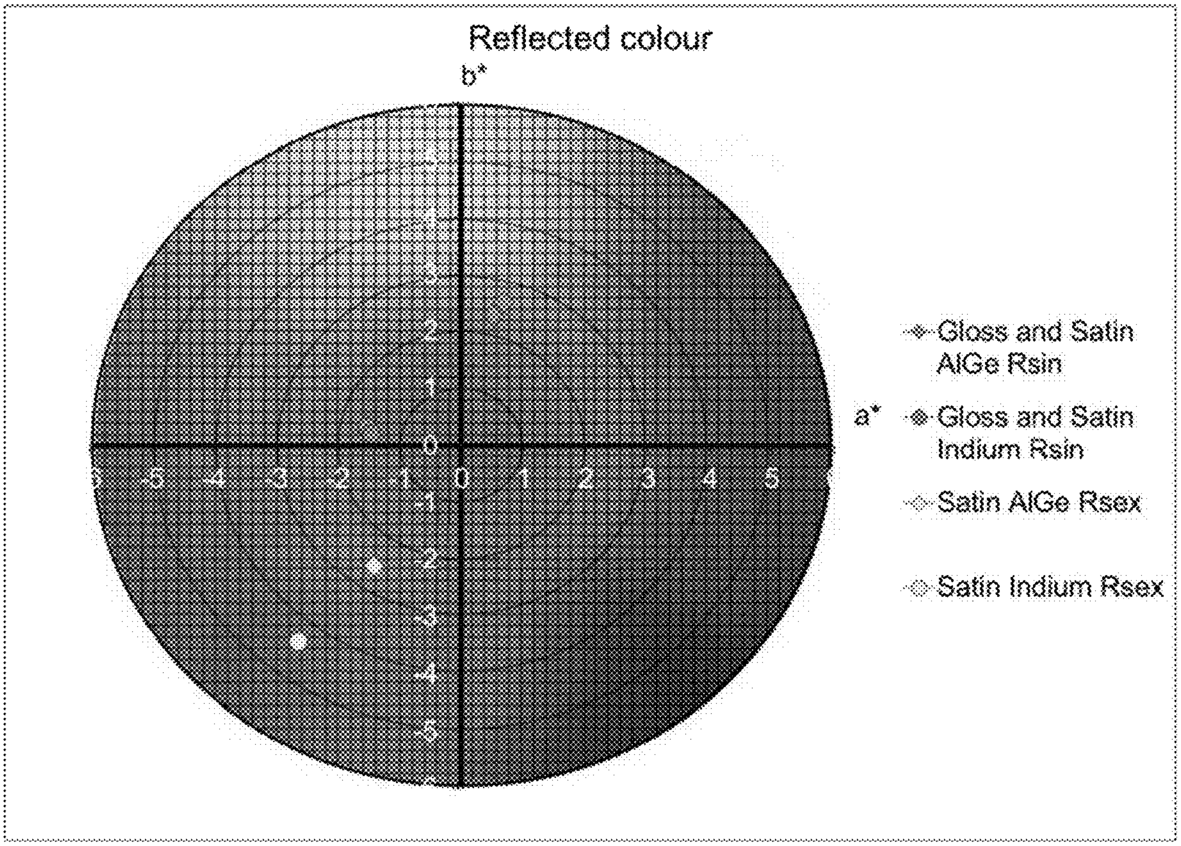
FIG. 11 illustrates the measured CIELAB colour of Gloss coated and Satin coated elements, especially radomes.

The CIELAB colour chart as measured with illuminant A/2 is shown in FIG. 11, and the measurements of reflection (specular included "R sin" and specular excluded "Rsex") are provided in Table 5 below.

TABLE 5

Reflectivity of decorative coated samples.

| | Reflectivity % (Rsin) | Reflectivity % (Rsex) |
| --- | --- | --- |
| Finish (with Aluminium and Germanium alloy) | | |
| Gloss 2 mm Samples | 44% | N/A |
| Satin 2 mm Samples | 44% | 22% |
| Gloss 2.3 mm Samples | 47% | N/A |
| Satin 2.3 mm Samples | 46% | 23% |
| Finish (with Indium alloy) | | |
| Gloss 2 mm Samples | 60% | N/A |
| Satin 2 mm Samples | 60% | 20% |

The reflectivity, including specular and diffuse reflected light (R sin), was comparable for both gloss and satin metallic look samples. However, the reflectivity on the 2.3 mm samples was typically higher than the 2 mm samples. This was likely an artefact of the coating process as the 2.3 mm samples consisted of small plaques, compared to the A4 sized 2 mm samples, and as such the 2.3 mm samples were closer to the splutter target during deposition.

All methods described herein can be performed in any suitable order unless indicated otherwise herein or clearly contradicted by context. The use of any and all examples, or exemplary language (e.g., "such as") provided herein, is intended merely to better illuminate the example embodiments and does not intrinsically pose a limitation on the scope of the claimed invention. However, such embodiments may be the subject of a claimed limitation, or may be considered as an additional feature in the event that it is included in a claim. No language in the specification should be construed as indicating any non-claimed element as essential.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

The subject headings used herein are included only for the ease of reference of the reader and should not be used to limit the subject matter found throughout the disclosure or the claims. The subject headings should not be used in construing the scope of the claims or the claim limitations.

Those skilled in the art will appreciate that the invention described herein is susceptible to variations and modifications other than those specifically described. It is to be understood that the invention includes all such variations and modifications. The invention also includes all of the steps, features and/or functions referred to, or indicated in this specification, individually or collectively, and any and all combinations of any two or more of the steps or features.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

Also, it is to be noted that, as used herein, the singular forms "a", "an" and "the" include plural aspects unless the context already dictates otherwise.

Future patent applications may be filed in Australia or overseas on the basis of or claiming priority from the present application. It is to be understood that the following provisional claims are provided by way of example only, and are not intended to limit the scope of what may be claimed in any such future applications. Also, features may be added to or omitted from the provisional claims at a later date so as to further define or re-define the invention or inventions.

The invention claimed is:

1. A decorative vehicle element including:

a radio-transmissive substrate having a first surface on a first side and a second surface on a second side; and a radio-transmissive decorative coating on the first surface of the radio-transmissive substrate, the radio-transmissive decorative coating including a decorative layer consisting of a metal or consisting of an alloy including a metal, wherein the decorative layer has a sheet resistivity greater than $10^6$ ohms per square (Ω/□).

2. The decorative vehicle element according to claim 1, wherein an overall residual stress of the radio-transmissive decorative coating is greater than or equal to −120 MPa.

3. The decorative vehicle element according to claim 1, wherein an overall residual stress of the radio-transmissive decorative coating is neutral or tensile.

4. The decorative vehicle element according to claim 1, wherein the alloy including a metal further includes a metalloid.

5. The decorative vehicle element according to claim 4, wherein metalloid is germanium or silicon.

6. The decorative vehicle element according to claim 5, wherein the metal alloy comprises germanium, and wherein a concentration of germanium is at least 25 wt % germanium.

7. The decorative vehicle element according to claim 1, wherein the decorative layer is up to 100 nm thick.

8. The decorative vehicle element according to claim 1, wherein the decorative layer consists of an alloy including a metal selected from the group consisting of: aluminum, tin, indium, silver and chromium.

9. The decorative vehicle element according to claim 1, wherein the decorative layer consists of a metal selected from the group consisting of: indium and tin.

10. The decorative vehicle element according to claim 1, wherein the radio-transmissive decorative coating includes multiple layers.

11. The decorative vehicle element according to claim 10, wherein the multiple layers of the radio-transmissive decorative coating include a stress controlling and/or bonding layer, wherein the stress controlling and/or bonding layer comprises at least one metal, at least one metal alloy and/or at least one dielectric layer.

12. The decorative vehicle element of claim 11, wherein the stress controlling layer is between the substrate and the decorative layer, or the stress controlling layer is on the first side of the radio-transmissive decorative layer.

13. The decorative vehicle element according to claim 10, wherein the multiple layers of the radio-transmissive decorative coating include at least one dielectric layer.

14. The decorative vehicle element according to claim 10, wherein the multiple layers of the radio-transmissive decorative coating include at least one decorative layer between at least two dielectric layers.

15. The decorative vehicle element according to claim 1, wherein the radio-transmissive decorative coating includes at least one protective hard coat layer, wherein the at least one protective hard coat layer at least partly comprises at least one light scattering additive.

16. The decorative vehicle element according to claim 15, wherein an overall residual stress of the radio-transmissive decorative coating including the protective hard coat greater is than or equal to −120 MPa.

17. The decorative vehicle element according to claim 1, wherein the radio-transmissive decorative coating includes a base hard coat layer provided on the first surface of the substrate.

18. The decorative vehicle element according to claim 1, wherein a dielectric layer is provided between the decorative layer consisting of a metal or an alloy including a metal and the substrate.

19. The decorative vehicle element according to claim 18, wherein a hard coat layer is provided between the decorative layer and the substrate.

20. The decorative vehicle element according to claim 15, wherein a dielectric layer is provided between the decorative layer and the at least one protective hard coat layer.

21. The decorative vehicle element according to claim 15, wherein the at least one protective hard coat layer comprises one or more abrasion resistant layers comprising a material selected from the group consisting of an organo-silicon, an acrylic, a urethane, melamine and an amorphous SiOxCyHz.

22. The decorative vehicle element according to claim 13, wherein the dielectric layer is represented by the formula $SiO_x$ or is silicon dioxide.

23. The decorative vehicle element according to claim 1, wherein the radio-transmissive decorative coating includes multiple dielectric layers and/or multiple decorative layers consisting of a metal or consisting of an alloy including a metal.

24. The decorative vehicle element according to claim 1, wherein the radio-transmissive substrate is selected from the group consisting of: Acrylonitrile Ethylene Styrene (AES), Acrylonitrile butadiene styrene (ABS), acrylonitrile styrene acrylate (ASA), Polyamide (PA), polybutylene terephthalate (PBT), Polycarbonate (PC), Polyethylene (PE), Polyethylene Teraphthalate (PET), Poly(methyl methacrylate) (PMMA), Polyoxymethylene (POM), Polypropylene (PP), Polyurethane (PU), PolyVinyl-Chloride (PVC), high-flow AES, acrylonitrile-(ethylene-propylene-diene)-styrene (AEPDS), blends of thermoplastics, and PC-ABS blended thermoplastic.

25. The decorative vehicle element according to claim 1, wherein the decorative element includes a heating element.

26. The decorative vehicle element according to claim 25, wherein the heating element includes a resistance wire.

27. The decorative vehicle element according to claim 26, wherein the resistance wire is molded within a polymer.

28. The decorative vehicle element according to claim 27, wherein the resistance wire is molded in a polymer film provided between the radio-transmissive substrate and the radio-transmissive decorative coating.

29. The decorative vehicle element according to claim 27, wherein the heating element is within a polymer selected from the group consisting of: Acrylonitrile Ethylene Styrene (AES), Acrylonitrile butadiene styrene (ABS), acrylonitrile styrene acrylate (ASA), Polyamide (PA), polybutylene terephthalate (PBT), Polycarbonate (PC), Polyethylene (PE), Polyethylene Teraphthalate (PET), Poly(methyl methacrylate) (PMMA), Polyoxymethylene (POM), Polypropylene (PP), Polyurethane (PU), Poly Vinyl-Chloride (PVC), high-flow AES, acrylonitrile-(ethylene-propylene-diene)-styrene (AEPDS), blends of thermoplastics, and PC-ABS blended thermoplastic.

30. The decorative vehicle element according to claim 25, wherein the heating element is provided in the radio-transmissive substrate.

31. The decorative vehicle element according to claim 1, wherein the decorative element has a radio wave signal attenuation less than 4 dB (two way) and/or less than 1.5 dB (one way) across a signal path.

32. The decorative vehicle element according to claim 1, wherein the decorative element has a radio wave signal attenuation less than 2 dB (two way) and/or less than 1 dB (one way) across a signal path.

33. The decorative vehicle element according to claim 1, wherein the radio-transmissive substrate is between 2 mm and 2.6 mm thick.

34. The decorative vehicle element according to claim 1, wherein the radio-transmissive substrate is 1.15 mm, 2.3 mm or 2.45 mm thick.

35. The decorative vehicle element according to claim 1, wherein the decorative element forms at least partly at least one radome, at least one handle, at least one control panel, at least one door handle, at least one trim, at least one ornamental strip, at least one decorative panel, at least one decorative cover, at least one mirror surface, or at least one door wave element.

36. A radar system including a radio wave transmitter, a radio wave receiver and the decorative vehicle element in accordance with claim 1.

37. The radar system according to claim 36, wherein a thickness of the radio-transmissive substrate of the decorative vehicle element is a multiple of $$\frac{\lambda i}{2}$$

wherein λi is the wavelength through the radio-transmissive substrate of a radio wave transmitted from the radio wave transmitter.

38. The radar system of claim 36 or claim 37, wherein the radio wave transmitter transmits radio waves in a frequency from 1.575 GHz±200 MHz, 2.0 GHz±200 MHz, 20 to 81 GHz, or from 76 to 81 GHz, or from 76 to 77 GHz, or is about 77 GHz, or is about 79 GHz or is about 81 GHz.

* * * * *